UNITED STATES PATENT OFFICE.

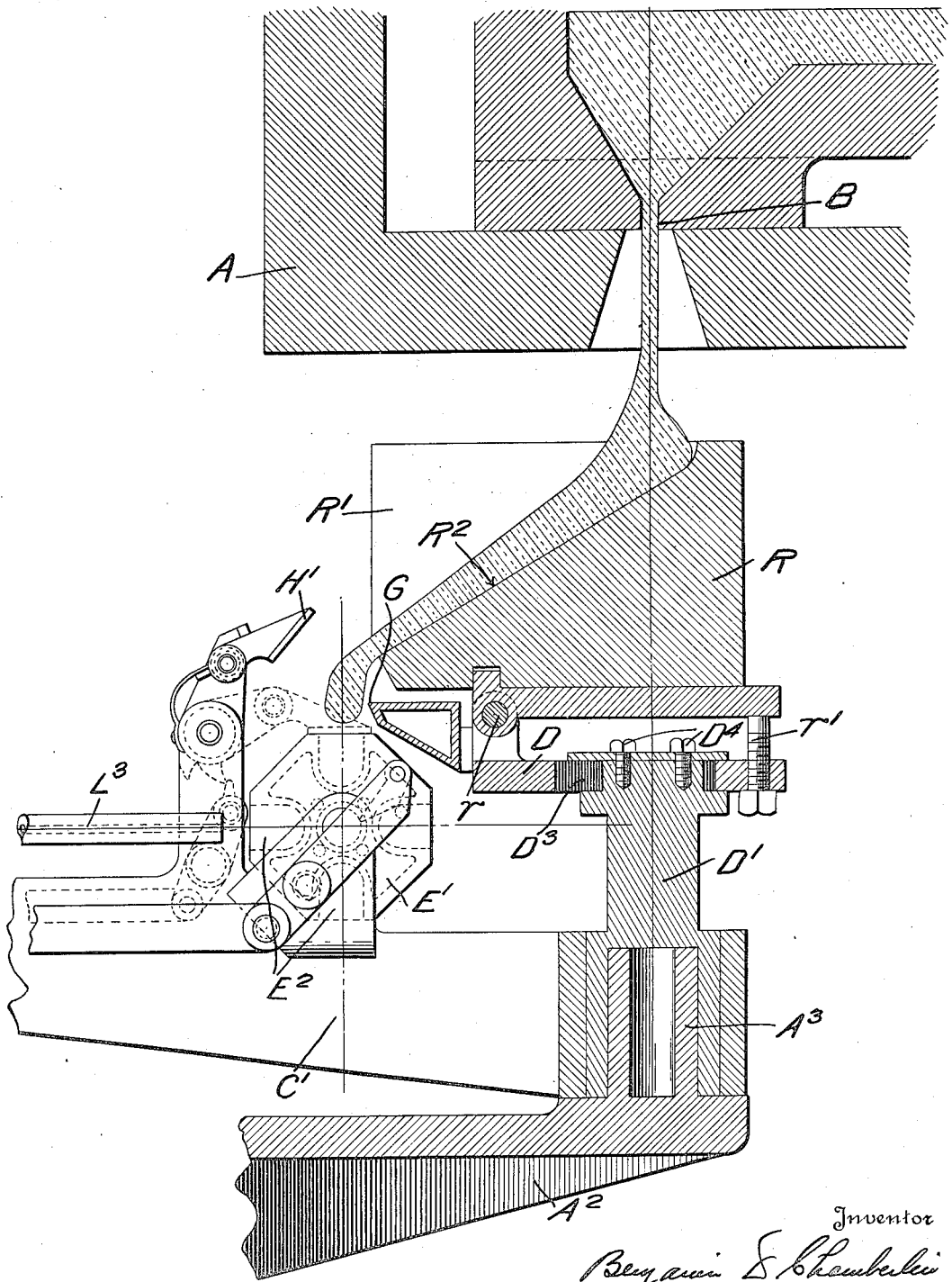

BENJAMIN DAY CHAMBERLIN, OF ROCHESTER, NEW YORK, ASSIGNOR TO EMPIRE MACHINE COMPANY, OF PORTLAND, MAINE, A CORPORATION OF MAINE.

PROCESS OF FLOWING GLASS.

1,256,980.   Specification of Letters Patent.   Patented Feb. 19, 1918.

Original application filed June 2, 1911, Serial No. 630,944. Divided and this application filed July 17, 1916. Serial No. 109,791.

*To all whom it may concern:*

Be it known that I, BENJAMIN D. CHAMBERLIN, a citizen of the United States of America, and a resident of Rochester, county of Monroe, and State of New York, have invented certain new and useful Improvements in Processes of Flowing Glass, of which the following is a specification.

This application is a continuance of my prior application for "Process and apparatus for the production of blown glass articles", filed June 2, 1911, Serial Number 630,944.

The invention disclosed herein is a process having for its object to provide improvements in the art of flowing glass. In the process herein described blanks are cast from a continuously flowing stream of glass having approximately the same cross section as the cast blank, and the invention here sought to be protected relates to this process and to a process for obtaining a desired cross-sectional area of a flowing stream by flowing the stream upon an inclined trough and varying the inclination of the trough to vary the cross-sectional area of the flowing stream.

The several steps and features constituting my invention will be further pointed out in the specification and in the claims which form a part of this application.

Referring to the accompanying drawing, the figure is a vertical section of the improved mechanism suitable for carrying out my process.

The furnace "A" is supported in the usual manner, and is provided with an orifice "B" in its bottom through which the molten glass may flow in a continuous stream during the working period.

Beneath the orifice "B", and in proximity thereto, is a trough "R" having side walls R', and an inclined face $R^2$, upon which the glass is flowed. This trough is mounted upon a horizontal pivot $r$ supported by upstanding ears formed on a horizontal slide "D" in the opposite end of which is carried the set screw $r'$ which contacts with the base of the trough for raising and lowering movement. By this mechanism, I am enabled to vary the cross sectional area of the flowing stream of glass at will, according to the size of the blank to be worked, and to properly determine, before the severing operation, the exact amount of glass to be formed into the finishing article. The slide "D" is slotted as at $D^3$ and is adjustably mounted upon a vertical standard D' by set screws $D^4$, so that the position of the trough in respect to the orifice of the furnace may be accurately adjusted. The standard D' is carried by and rotatively mounted on a vertical pintle $A^3$ which is formed on the casting $A^2$ forming a part of any suitable supporting structure.

By preference, the axial line of the standard D' should be such that it is in alinement with the orifice of the furnace, so that if it is desired to move the trough "R" in a horizontal plane for adjustment, or for feeding a plurality of finishing machines, this may be done without moving the entire structure in respect to the orifice of the furnace.

Located adjacent to, and beneath the lower lip of the trough "R" is a suitable receiving element. In the drawing, this is shown as a rotating parison mold E', having a plurality of cavities $E^2$ formed therein for the reception of the charges of glass after the severing of the latter from the flowing stream.

The mechanism by which the flowing stream of glass is severed into charges comprises an outwardly extending fixed element carried by the slide "D" and terminating in a cutting edge "G" co-acting with which is the movable shearing element H' carried by a vertical bracket mounted on an arm C' projecting horizontally from the pintle $A^3$, and actuated in any suitable manner.

From the above description it will be seen that I have provided a method for directing a flowing stream of glass to a finishing machine, the cross sectional area of the flowing stream being variably regulable if desired to make the charge severed therefrom equal to the cross sectional area of the molded blank as shaped by the mold, by mounting the trough "R" upon a horizontal pivot $r$ and which may be adjusted in any desired position by the set screw $r'$ as herebefore described, and in respect thereto it will be understood that I do not limit myself to the shearing mechanism, and the mold shown for receiving the severed charges, inasmuch as my process is not directed to the features thereof.

In the drawing I have represented a hollow blow-pipe L³, which may be projected in any suitable manner against the blank formed in the mold, causing the blank to adhere thereto due to the adhesion of the heated glass to the end of the blow pipe. After this has taken place the blank may be removed on the blow-pipe from the cavity of the mold and blown while on such blow-pipe.

Having thus described my invention, what I claim and desire to secure by Letters Patent is,—

1. A step in the delivery of a flowing stream of glass to a finishing machine, which consists in flowing the said stream upon an inclined trough and varying the inclination of the said trough to vary the cross sectional area of the flowing stream.

2. The hereinbefore described process of delivering glass to a receiving mold, which consists in flowing a stream of glass upon an inclined trough and varying the inclination of the said trough to vary the diameter of the stream fed therefrom to the mold.

3. The hereinbefore described process of obtaining glass from a furnace, which consists in flowing a stream of glass upon an inclined trough, varying the inclination of the trough to vary the cross sectional area of the flowing stream, and then severing the glass after it leaves the trough and when its cross sectional area has been determined by the inclination of the trough.

4. The hereinbefore described process of charging a mold, which consists in flowing a stream of glass upon an inclined trough and from the trough into the mold, and varying the inclination of the trough to cause the cross sectional area of the stream flowing therefrom to be substantially equal to the cross sectional area of the mold, and severing the glass into charges between the trough and the mold.

5. The hereinbefore described process of manufacturing blown glass articles, which comprises casting a solid blank in a mold from a continuously flowing stream of glass having approximately the same cross-section as the blank, and finishing the said blank by blowing.

6. The hereinbefore described process of manufacturing blown glass articles, which comprises casting a solid blank in a mold from a continuously flowing stream of glass and having approximately the same cross-section as the blank, and securing a blow-pipe to the said blank by the adhesion of the heated glass and blowing.

7. The hereinbefore described process of manufacturing blown glass articles, which comprises the formation of a continuous stream of glass from material in a thoroughly molten condition, severing the stream into masses of the desired volume, forming such severed masses in molds into solid blanks of approximately the same cross-sectional area as the stream, and blowing such blanks.

In testimony whereof I hereunto affix my signature this 11th day of July 1916.

BENJAMIN DAY CHAMBERLIN.